UNITED STATES PATENT OFFICE.

MAX GRÜNZWEIG, OF LUDWIGSHAFEN-ON-THE-RHINE, GERMANY.

PROCESS FOR IMPREGNATING CERAMIC AND OTHER POROUS OBJECTS.

1,124,891. Specification of Letters Patent. Patented Jan. 12, 1915.

No Drawing. Application filed May 28, 1908. Serial No. 435,540.

*To all whom it may concern:*

Be it known that I, MAX GRÜNZWEIG, student of chemistry, a subject of the German Emperor, and resident of Ludwigshafen-on-the-Rhine, in the Kingdom of Bavaria, Germany, (with the post-office address Jaegerstrasse No. 11,) have invented new and useful Improvements in Processes for Impregnating Ceramic and other Porous Objects, of which the following is a specification.

This invention relates to a process primarily intended to protect ceramic products from damp. The process may be applied too to other materials and the materials may be protected against other bodies than water. Hitherto for this purpose ceramic objects have either been glazed or soaked in liquid solutions of pitch, resin or the like, the superfluous solvent being afterward removed by drying in the air or at a high temperature. But this method causes the objects so treated to increase in weight and decreases more or less the pores of the material.

The present invention consists in subjecting the objects to the hot vapors of the products of distillation or organic bodies, which can be called collectively "higher hydrocarbons" even if strictly speaking they cannot all be grouped under this heading owing to the fact that their constitution has not been determined. In this manner the walls of the pores are covered with a microscopically thin skin, which prevents the imbibition of moisture without considerably increasing the weight or decreasing the porosity.

The process is carried out in a very simple manner. If tar is used, for example, the objects to be treated are introduced into a vessel at about 250° C. and tar is then poured into the vessel. The objects can be cold or they can be previously warmed. The brown cloud produced is precipitated in the pores and on the surface of the objects. The time required depends, of course, on the material of which the object is made and on the size of the latter, and on whether a complete impregnation is required or not. The time may be less than an hour or it may extend over several hours. When tar is used the objects treated assume a darker tone and increase about 2 per cent. in weight. This impregnation can under certain circumstances be combined with the burning of the ceramic object, the impregnating material being led into the kiln during the cooling stage, the temperature being that suitable for vaporization.

Now what I claim and desire to secure by Letters Patent is the following:

1. Process for producing a microscopically thin skin on the walls of the pores of ceramic objects and the like and thereby waterproofing said objects, consisting in subjecting the articles to be treated to hot vapors of the higher hydrocarbons produced by distillation of organic bodies at a temperature below the point of decomposition of the vapors.

2. Process for forming a microscopically thin skin on the walls of the ports of ceramic objects and thereby waterproofing the objects, consisting in subjecting the objects to hot vapors of tar at a temperature below the point of decomposition of the vapor.

3. Process of forming a microscopically thin skin on the walls of the pores of ceramic objects and thereby waterproofing the same, consisting in subjecting the objects to hot vapors of the higher hydrocarbons produced by distillation of organic bodies at a temperature below the point of decomposition of the vapors, the said vapors being produced by introducing the impregnating material into the kiln during the cooling stage.

4. Process of producing a microscopically thin skin on the walls of the pores of ceramic objects and thereby waterproofing the objects, consisting in subjecting the objects to the hot vapors of the higher hydrocarbons produced by the distillation of organic bodies at a temperature below the point of decomposition of the vapors, thereby precipitating the said vapors in undecomposed form on the walls of the pores.

5. The herein described process of providing porous ceramic articles with a moisture repellent coating, which consists in subjecting said articles to the action of hot vapors produced by the distillation of organic bodies at a temperature below the point of decomposition of such vapors, whereby there is produced upon the cell walls of such articles a film consisting of distilled hydrocarbons in contradistinction to free carbon, and which film does not materially increase the weight of the articles or destroy their porous nature.

In testimony, that I claim the foregoing as my invention, I have signed my name in presence of two witnesses, this sixteenth day of May 1908.

MAX GRÜNZWEIG.

Witnesses:
CARL MESSER,
JOS. H. LEUTE.